(12) United States Patent
Yoshikawa

(10) Patent No.: US 9,921,564 B2
(45) Date of Patent: Mar. 20, 2018

(54) PROGRAMMABLE LOGIC CONTROLLER

(71) Applicant: Mitsubishi Electric Corporation, Tokyo (JP)

(72) Inventor: Takashi Yoshikawa, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 137 days.

(21) Appl. No.: 14/906,007

(22) PCT Filed: Mar. 17, 2014

(86) PCT No.: PCT/JP2014/057181
§ 371 (c)(1),
(2) Date: Jan. 19, 2016

(87) PCT Pub. No.: WO2015/140910
PCT Pub. Date: Sep. 24, 2015

(65) Prior Publication Data
US 2016/0170398 A1    Jun. 16, 2016

(51) Int. Cl.
*G06F 15/16* (2006.01)
*G05B 19/05* (2006.01)

(52) U.S. Cl.
CPC .... *G05B 19/05* (2013.01); *G05B 2219/14008* (2013.01)

(58) Field of Classification Search
CPC ............... G05B 19/05; G05B 23/0218; G05B 23/0256; G05B 2219/4008; G01R 31/3181; G01R 31/316
See application file for complete search history.

(56) References Cited

U.S. PATENT DOCUMENTS 6,411,987 B1    6/2002   Steger et al.
2008/0240105 A1*  10/2008   Abdallah ................ H04L 12/66
                                                 370/392

FOREIGN PATENT DOCUMENTS

JP      06-095718 A     4/1994
JP      06095718 A  *   4/1994
(Continued)

OTHER PUBLICATIONS

"Programmable Logic Controller System for Controlling and Monitoring Home Application Using Mobile Network"—Instrumentation and Measurement Technology Conference, 2006, Apr. 2006 http://ieeexplore.ieee.org/document/4124369/.*

(Continued)

*Primary Examiner* — Randy Scott
(74) *Attorney, Agent, or Firm* — Sughrue Mion, PLLC; Richard C. Turner

(57) ABSTRACT

A PLC compares previously acquired device data with currently acquired device data when collecting device data on a control target device over three or more times within one polling time, and stores changed device data as changed data when they are different from each other. When transmitting the changed data to a PC in each polling, the PLC compares the changed data with collected device data. When the total amount of changed data is equal to or larger than the total amount of collected device data, the PLC restores collected device data by using the changed data and transmits the restored device data to the PC, and, when the total amount of changed data is smaller than the total amount of collected device data, the PLC transmits the changed data to the PC.

6 Claims, 5 Drawing Sheets

(56) References Cited

FOREIGN PATENT DOCUMENTS

| | | | |
|---|---|---|---|
| JP | 06-149320 A | | 5/1994 |
| JP | 2000-165965 A | | 6/2000 |
| JP | 2003-280732 A | | 10/2003 |
| JP | 2003280732 A | * | 10/2003 |
| JP | 2007-249759 A | | 9/2007 |
| JP | 2012-175376 A | | 9/2012 |

OTHER PUBLICATIONS

Communication dated Oct. 4, 2016, from the German Patent Office in counterpart German application No. 11 2014 003 067.8.
Japanese Notice of Reasons for Rejection issued in JP 2015-520746 dated Jul. 14, 2015.
Japanese Notice of Allowance issued in JP 2015-520746 dated Nov. 24, 2015.
International Search Report of PCT/JP2014/057181 dated Jun. 17, 2014.

* cited by examiner

PROGRAMMABLE LOGIC CONTROLLER

CROSS REFERENCE TO RELATED APPLICATIONS

This is a National Stage of International Application No. PCT/JP2014/057181 filed Mar. 17, 2014, the contents of which are incorporated herein by reference in its entirety.

FIELD

The present invention relates to a programmable logic controller that transmits device data stored in the programmable logic controller to a display apparatus.

BACKGROUND

PLCs (programmable logic controllers) that control control target devices (such as industrial machines) used in factories and the like include device memories for temporarily storing respective pieces of device data on the control target devices. Such PLCs (sequencers) control the control target devices by reading and writing the respective pieces of device data in accordance with a sequence program that is a program created by the user. A technology for use in systems in which the PLC is used is widely known. With this technology, the values of respective pieces of device data are transmitted to the PC (personal computer) side and the changes and the state of each device are displayed on the display apparatus such as a PC.

With the above conventional system in which the PLC is used, when there is a transmission request from the PC to transmit device data to the PLC, all the device data acquired by the PLC at specified time intervals is transmitted to the PC. In such a case, as the amount of device data requested by the PC side to be transmitted increases, the amount of data to be transmitted from the PLC to the PC also increases. Thus, the load on the device-data communication process increases, which in some cases results in the loss of device data to be transmitted to the PC or affecting the processes of other functions that are controlled by the PLC.

In such a system, there is device data whose value did not change from that of the previously transmitted device data among the values of device data to be transmitted. It is wasteful, for the system that displays the state of data, to transmit device data whose value did not change and this causes an increase in the communication load. Thus, to reduce the communication load, a method has been used in which the values of the previously transmitted device data are compared with those of the currently transmitted device data and only the device data whose value has changed is transmitted (for example, see Patent Literatures 1, 2, and 3).

CITATION LIST

Patent Literature

Patent Literature 1: Japanese Patent Application Laid-open No. 2003-280732
Patent Literature 2: Japanese Patent Application Laid-open No. H06-95718
Patent Literature 3: Japanese Patent Application Laid-open No. 2000-165965

SUMMARY

Technical Problem

In the technologies in Patent Literatures 1, 2, and 3 described above, to reduce the communication load, only the device data whose value has changed when the value of the previously transmitted device data is compared with that of the currently transmitted device data is transmitted. The technologies in Patent Literatures 1, 2, and 3 described above, however, have a problem in that only the change between two pieces of device data (one change) is taken into consideration and thus the handling of three or more pieces of device data (two or more changes) at the same time is not taken into consideration.

The present invention has been achieved in view of the above and it is an object of the present invention to provide a programmable logic controller that can efficiently transmit data even when there is a transmission request to transmit device data collected over three or more times within the polling time.

Solution to Problem

In order to solve the above problems and achieve the object, a programmable logic controller according to an aspect of the present invention includes: a data collection processing unit that collects, from a control target device, device data that depends on a state of the control target device; a storage unit that stores change information on changed device data among the device data; and a communication processing unit that, when a transmission request to transmit the device data is received by using a polling system from a display apparatus that displays a state of the control target device, transmits the change information or the collected device data to the display apparatus, wherein the data collection processing unit collects the device data over three or more times within one polling time and compares previously acquired device data with currently acquired device data every time the collection is performed; generates the change information and causes the storage unit to store the change information when the previously acquired device data is different from the currently acquired device data; compares a total amount of the change information with a total amount of the collected device data when transmitting the change information or the collected device data to the display apparatus in each polling; and restores, when the total amount of the change information is equal to or larger than the total amount of the collected device data, the collected device data by using the change information, and the communication processing unit transmits, when the total amount of the change information is equal to or larger than the total amount of the collected device data, restored device data to the display apparatus and transmits, when the total amount of the change information is smaller than the total amount of the collected device data, the change information stored in the storage unit to the display apparatus.

Advantageous Effects of Invention

According to the present invention, an effect is obtained where even when there is a transmission request to transmit device data collected over three or more times within the polling time, the data can be transmitted efficiently.

DESCRIPTION OF EMBODIMENTS

A programmable logic controller according to embodiments of the present invention will be explained below in detail with reference to the drawings. This invention is not limited to the embodiments.

Embodiment

Figure 1:
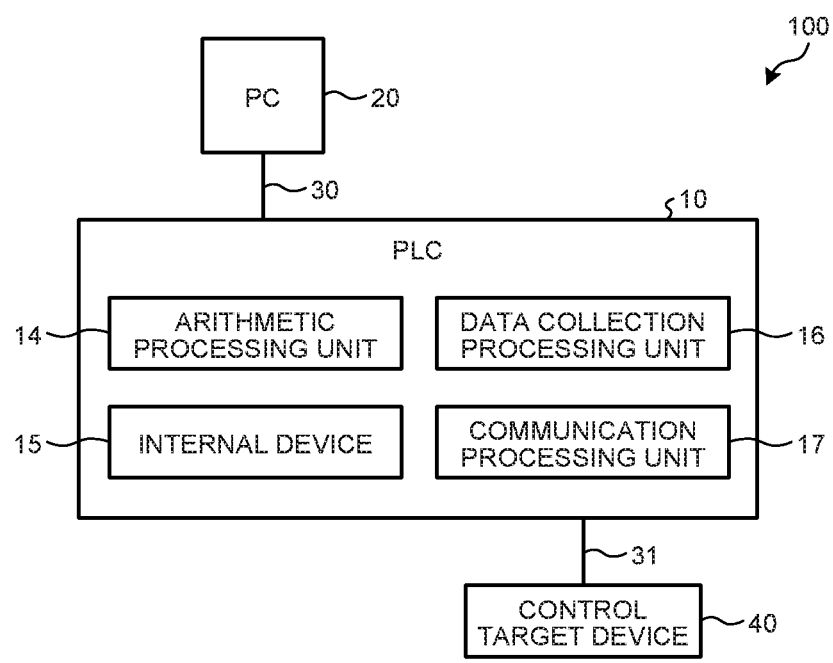
FIG. 1 is a diagram illustrating the configuration of a PLC according to an embodiment of the present invention.

FIG. 1 is a diagram illustrating the configuration of a PLC according to an embodiment of the present invention. A control system 100 includes a PLC (programmable logic controller) 10, a PC (personal computer) 20, and a control target device 40. The PLC 10 is connected to an apparatus (display apparatus) that can display data, such as the PC 20, via a communication cable 30. The apparatus connected to the PLC 10 is not limited to the PC 20 and may be any apparatus.

The PLC 10 is connected to the control target device 40, such as an industrial machine, via a communication cable 31. The PLC 10 is an apparatus that controls the control target device 40 and stores data (hereinafter, device data) on the control target device 40 that changes according to the operation (state) of the control target device 40. The PLC 10 transmits device data to the PC 20 in response to a request from the PC 20. In the present embodiment, the PLC 10, which is an apparatus configured as a unit, controls the control target device 40, processes a plurality of pieces of device data, and transmits the device data to the PC 20. Here, a device indicates elements that are represented by alphabetical characters used in a ladder program in the PLC 10.

The PC 20 displays the state and the like of the control target device 40 by displaying the changes and the state of device data. The PC 20 acquires device data from the PLC 10 by transmitting a data acquisition request to the PLC 10.

The PLC 10 acquires a plurality of pieces of device data over a plurality of times within the polling time interval and accumulates the device data. When there is a transmission request from the PC 20 to transmit the device data acquired over three or more times within one polling time, the PLC 10 according to the present embodiment compares the values of the respective pieces of device data and transmits, to the PC 20, only the device data whose value has changed. In other words, even when the device data changes over a plurality of times within one polling time, the PLC 10 according to the present embodiment compares the values of the respective pieces of device data and transmits, to the PC 20, only the device data whose value has changed (changed data).

The PLC 10 includes an arithmetic processing unit 14, an internal device (device memory) 15, a data collection processing unit 16, and a communication processing unit 17. The arithmetic processing unit 14 performs various determination processes in response to operations (instructions) performed by the user. The internal device 15 is a storage device (storage unit) that is used for the arithmetic process performed by the arithmetic processing unit 14. Device data acquired from the control target device 40 is stored in the internal device 15. The internal device 15 has a capacity to store data. In the present embodiment, data stored in the internal device 15 is referred to as device data.

The data collection processing unit 16 collects device data from the control target device 40 at predetermined intervals (for example, every scan time) and stores the values of the device data in the internal device 15. When the device data is acquired, the data collection processing unit 16 according to the present embodiment compares the previously acquired device data with the currently acquired device data. Only when the device data has changed, does the data collection processing unit 16 store the changed device data in the internal device 15.

The data collection processing unit 16 compares the total amount of all the acquired device data with the total amount of changed device data and sets a smaller total amount of data as data to be transmitted to the PC 20.

The communication processing unit 17, for example, transmits and receives various pieces of data to and from the PC 20. The communication processing unit 17 receives a transmission request from the PC 20 to transmit device data and transmits the device data to the PC 20.

An explanation has been given in FIG. 1 of a case where there is one control target device 40 connected to the PLC 10; however, a plurality of the control target devices 40 may be connected to the PLC 10. In such a case, the PLC 10 collects device data from the control target devices 40 and transmits the collected device data to the PC 20. In such a case, the PLC 10 includes the internal devices 15 corresponding to the respective control target devices 40. Each of the internal devices 15 has a capacity to store device data on the corresponding control target device 40. The PLC 10 stores the acquired device data in the corresponding internal device 15.

Figure 2:
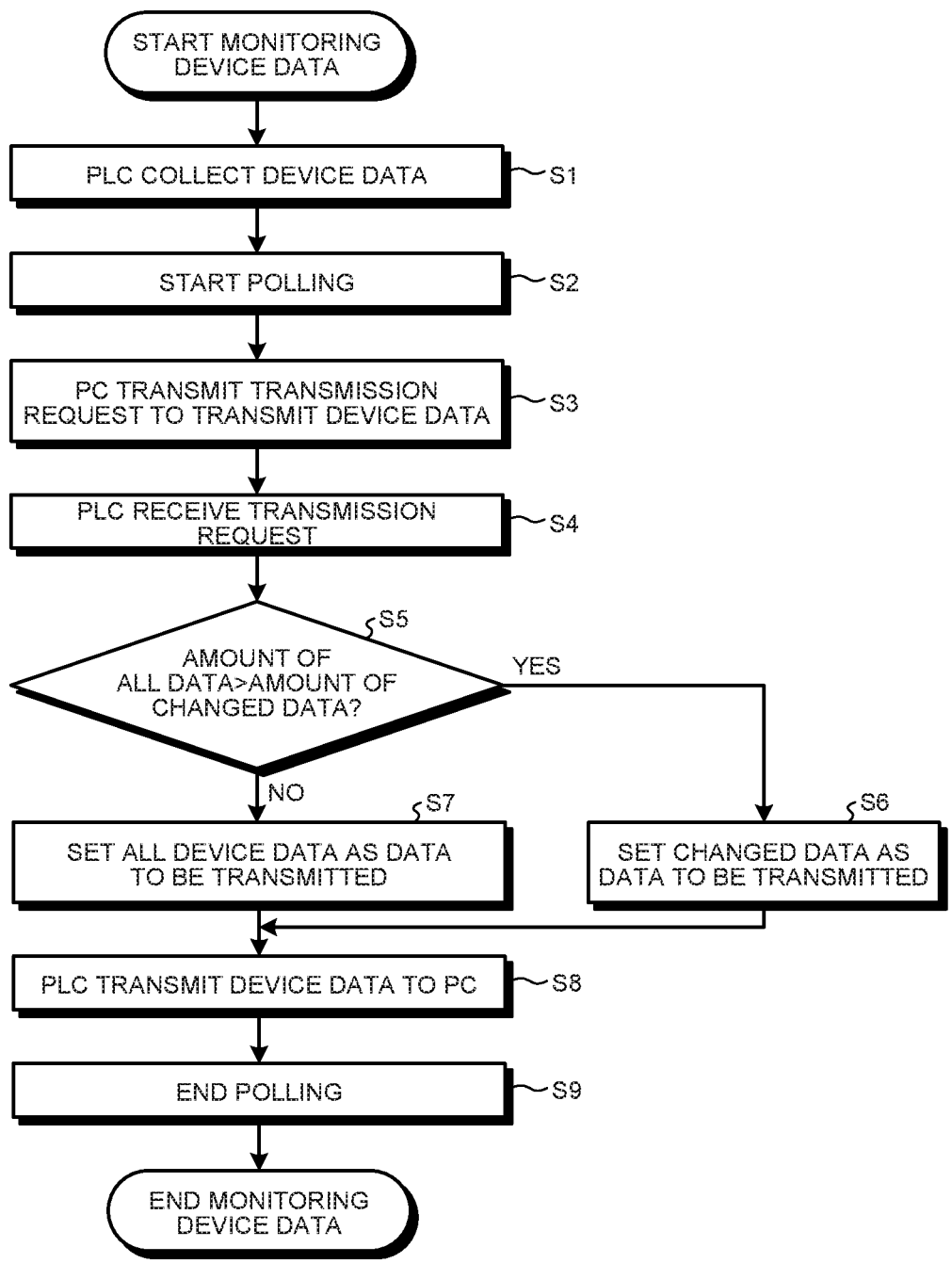
FIG. 2 is a flowchart illustrating the operation procedure of the PLC according to the embodiment.
Figure 3:
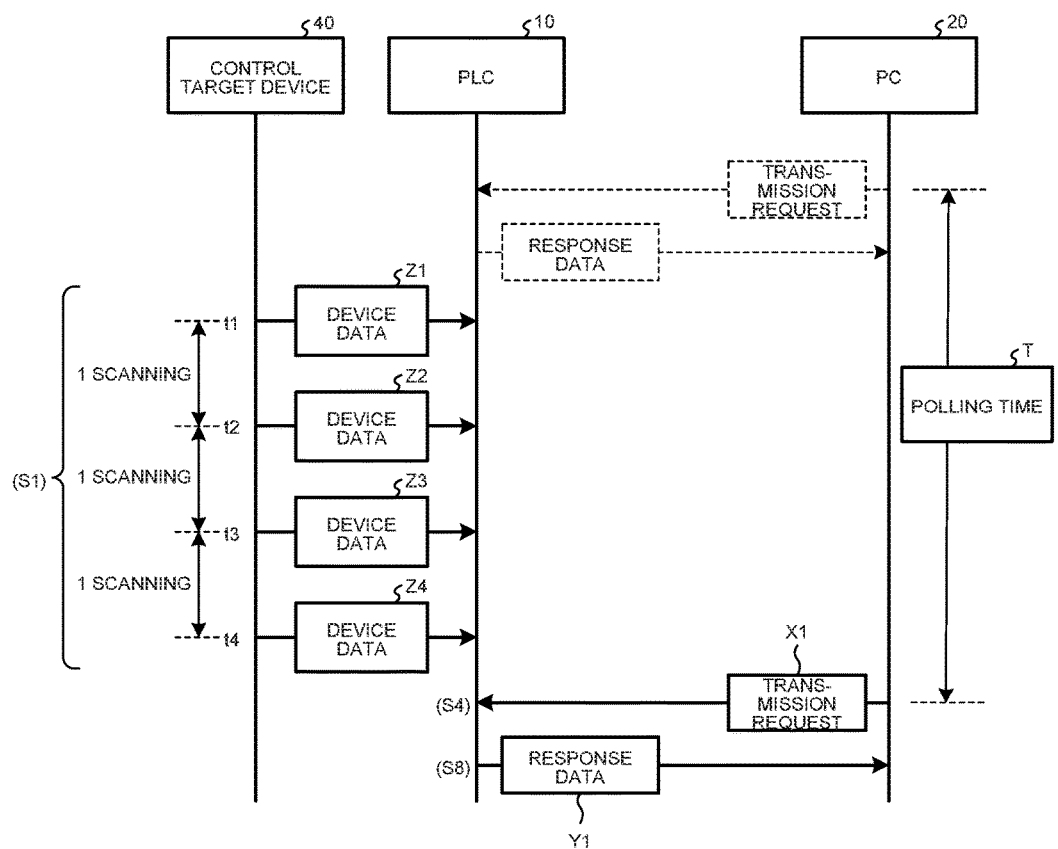
FIG. 3 is a sequence diagram illustrating the operation procedure of the PLC according to the embodiment.

The operation procedure of the PLC 10 will be explained here. FIG. 2 is a flowchart illustrating the operation procedure of the PLC according to the embodiment. FIG. 3 is a sequence diagram illustrating the operation procedure of the PLC according to the embodiment. FIG. 2 and FIG. 3 illustrate the operation procedures of the PLC 10 and the PC 20 when the PC 20 monitors device data (mobile data).

When the PLC 10 controls the control target device 40, the PLC 10 collects device data from the control target device 40 (Step S1). Specifically, the data collection processing unit 16 collects device data from the control target device 40 and stores the device data in the internal device 15.

The data collection processing unit 16 acquires any of device data Z1 to Z4 from the control target device 40 every scanning (once in each scanning). Thus, the data collection processing unit 16 sequentially acquires the device data over three or more times within one polling time of the PC 20.

Specifically, the data collection processing unit 16 acquires the device data Z1 during the first scanning (at timing t1) and acquires the device data Z2 during the second scanning (at timing t2). Moreover, the data collection processing unit 16 acquires the device data Z3 during the third scanning (at timing t3) and acquires the device data Z4 during the fourth scanning (at timing t4). The data collection processing unit 16 stores the acquired device data Z1 to Z4 in the internal device 15.

As described above, the data collection processing unit 16 acquires any of the device data Z1 to Z4 from the control target device 40 every scanning. When the data collection processing unit 16 acquires the device data Z1 to Zn (n is a natural number equal to or greater than two) over a plurality of times (four times in this example), it is assumed that the data acquired during the first scanning is the currently acquired device data. In this case, the data acquired during the next scanning becomes the currently acquired device data at this time and the data acquired during the previous scanning becomes the previously acquired device data. In such a manner, the previously acquired scan data is scan data acquired immediately before the currently acquired scan data.

For example, it is assumed that device data Zm is acquired during the m-th (m is a natural number of any one of 1 to n) scanning and device data Z(m+1) is acquired during the (m+1)th scanning. In such a case, during the m-th scanning, the device data Zm is the currently acquired device data. During the (m+1)th scanning, the device data Zm is the previously acquired device data and the device data Z(m+1) is the currently acquired device data. For example, during the third scanning, the data acquired during the second scanning becomes the previously acquired device data and the data acquired during the third scanning becomes the currently acquired device data.

When the device data Z1 to Z4 is stored, the data collection processing unit 16 compares the previously acquired device data with the currently acquired device data and, only when the device data has changed, stores the changed device data in the internal device 15.

For example, when the data collection processing unit 16 compares the device data Z1 with the device data Z2, if they have different values, the data collection processing unit 16 stores the device data Z2 that is newer device data in the internal device 15. When they have the same value, the data collection processing unit 16 deletes the newer device data Z2 and keeps the older device data Z1 such that it is stored in the internal device 15. The data collection processing unit 16 adds, to the changed device data, device information, with which the device (the control target device 40) from which the device data is acquired can be identified, and timing data, which indicates the timing at which the device data changes. Hereinafter, data obtained by adding device information and timing data to the changed device data is referred to as changed data.

Thereafter, the PC 20 acquires the device data from the PLC 10. In this case, the data is transferred between the PC 20 and the PLC 10 by using a polling system. The polling system is a system in which the PC 20 issues a transmission request to transmit data to the PLC 10 at predetermined time intervals and, in response to the request, the PLC 10 transmits the data to the PC 20. Specifically, when the polling is started (Step S2), the PC 20 sends, to the PLC 10, a transmission request X1 to transmit the device data (Step S3). The PLC 10 receives the transmission request X1 to transmit the device data (Step S4). Then, the PLC 10 sends response data Y1 in response to the transmission request X1 to the PC 20. The response data Y1 is the device data acquired from the control target device 40.

Because the changed data includes device information and timing data, the amount of changed data is in some cases larger than the total amount of all the device data Z1 to Z4. For example, when a large number of pieces of acquired device data changes from the previously acquired device data, the amount of changed data in some cases becomes larger than the amount of all the device data.

Accordingly, before the data collection processing unit 16 transmits the device data to the PC 20, the data collection processing unit 16 compares the amount of all the device data Z1 to Z4 with the amount of changed data (total amount) (Step S5). In this case, the data collection processing unit 16 calculates the number of times the device data is acquired (in this example, four times) on the basis of polling time T and the scan time. Then, the data collection processing unit 16 calculates the amount of all the data on the basis of the calculated number of times the device data is acquired. The calculated number of times the device data is acquired is used for recognizing the number of times the amount of data needs to be summed. When the number of times the device data is acquired is obtained, the amount of all the data can be calculated using an accumulation of a device data capacity (capacity×number of times). In such a manner, the data collection processing unit 16 calculates the amount of all the data by using the calculated number of times the device data is acquired. The data collection processing unit 16 selects a smaller amount data from among the total amount of changed data and the amount of all the device data Z1 to Z4.

Specifically, when the amount of all the data is larger than the amount of changed data (Yes at Step S5), the data collection processing unit 16 sets the changed data as data to be transmitted to the PC 20 (Step S6).

In contrast, when the amount of all the data is equal to or smaller than the amount of changed data (No at Step S5), the data collection processing unit 16 sets all the device data Z1 to Z4 as data to be transmitted to the PC 20 (Step S7). In this case, the data collection processing unit 16 derives the value of the device data that did not change and its scan timing on the basis of the timing data.

At this point, the data collection processing unit 16 restores device data that was not stored on the basis of the device data immediately before the device data that was not stored. Specifically, the device data acquired second is restored on the basis of the changed data corresponding to the device data acquired second and the device data acquired first. Thereafter, the device data acquired third is restored on the basis of the changed data corresponding to the device data acquired third and the device data acquired second. In such a manner, the (L+1)th device data is restored on the basis of the L-th (L is a natural number) device data. Then, the data collection processing unit 16 restores the device data that was not stored on the basis of the results of the derivation. Accordingly, the data collection processing unit 16 creates all the device data Z1 to Z4 that is the data to be transmitted to the PC 20.

The communication processing unit 17 of the PLC 10 transmits the transmission target (device data) set by the data collection processing unit 16 to the PC 20 as the response data Y1 (Step S8). Then, polling between the PLC 10 and the PC 20 ends (Step S9).

The PC 20 acquires the device data (changed data or all the device data) from the PLC 10, thereby monitoring the internal device 15 of the PLC 10 and displaying the device data.

The device data Z1 to Z4 may each include a plurality of types of data. In such a case, the data collection processing unit 16 transmits, for each type of data, either the changed data or all the device data to the PC 20 as the response data Y1.

Figure 4:
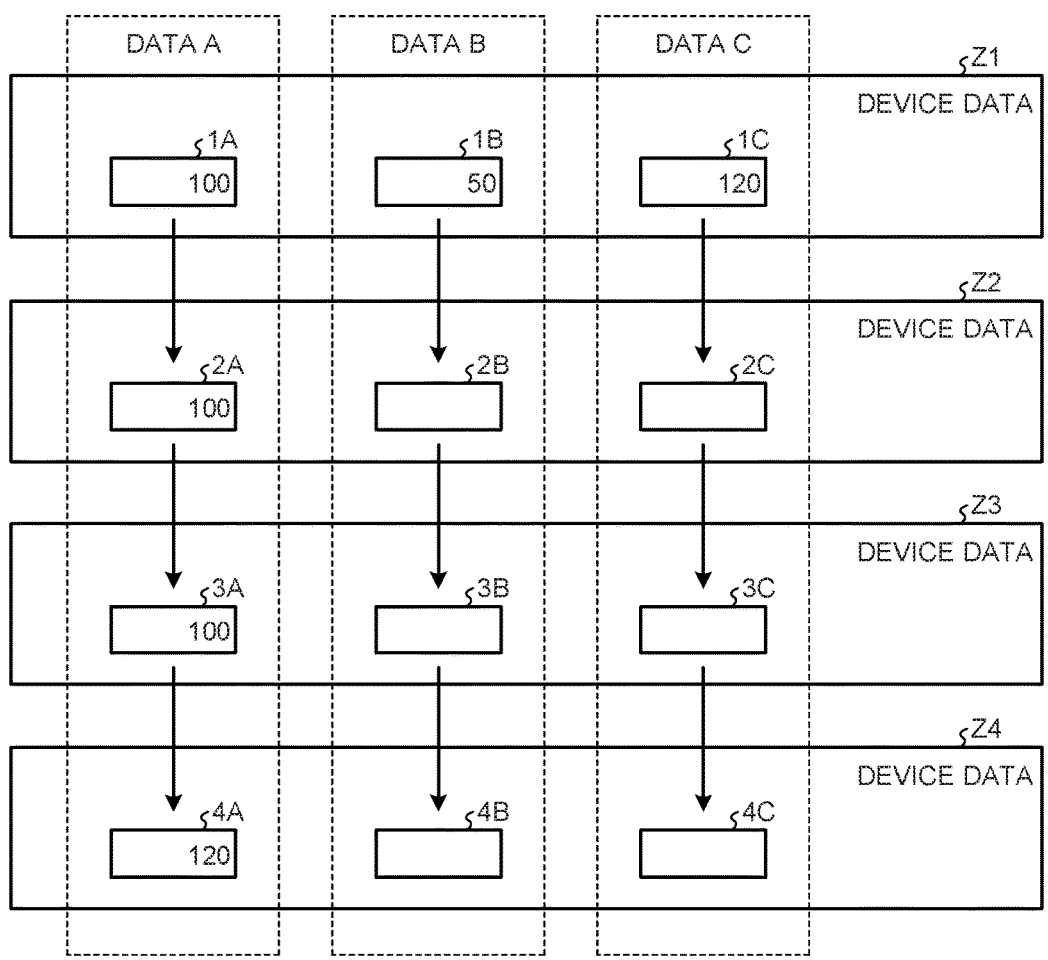
FIG. 4 is a diagram describing the change of device data.

FIG. 4 is a diagram describing the change of device data. FIG. 4 illustrates the case where the device data Z1 to Z4 each include data A to C. The device data Z1 includes data 1A, 1B, and 1C. The device data Z2 includes data 2A, 2B, and 2C. The device data Z3 includes data 3A, 3B, and 3C and the device data Z4 includes data 4A, 4B, and 4C. When, for example, the device data changes from the device data Z1 to the device data Z2, then to the device data Z3, and then to the device data Z4, the data A changes from the data 1A to the data 2A, then to the data 3A, and then to the data 4A. In a similar manner, the data B changes from the data 1B to the data 2B, then to the data 3B, and then to the data 4B, and the data C changes from the data 1C to the data 2C, then to the data 3C, and then to the data 4C.

For example, each value of the data 1A, 2A, and 3A is 100 and the value of the data 4A is 120. This means that the data A does not change when the device data Z changes from the device data Z1 to the device data Z2 and then to the device data Z3 but the data A does change when the device data Z changes to the device data Z4.

Figure 5:
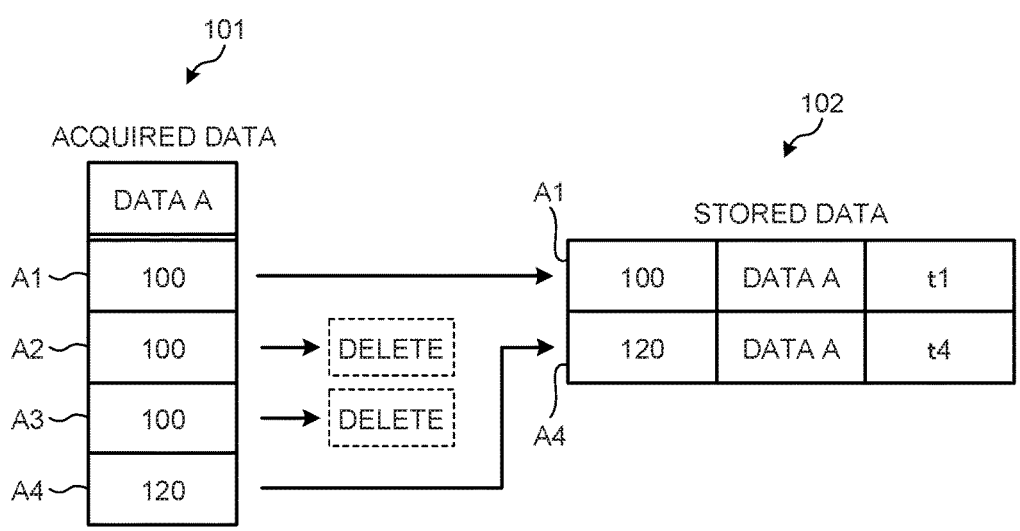
FIG. 5 is a diagram describing acquired data and data to be stored.

FIG. 5 is a diagram describing acquired data and data to be stored. FIG. 5 illustrates acquired data 101 that is acquired from the control target device 40 by the data collection processing unit 16 and stored data 102 that is stored in the internal device 15 by the data collection processing unit 16.

An explanation will be given here, for example, of a case where the PLC 10 acquires the data A as illustrated in FIG. 4. In such a case, the data collection processing unit 16 of the PLC 10 receives, as the acquired data 101, the values of the data A from the control target device 40. The data collection processing unit 16 acquires four pieces of device data, i.e., the device data Z1 to Z4; therefore, the data collection processing unit 16 acquires four values as the values of the data A.

In such a case, if the data A1 and the data A2 have the same value, the data collection processing unit 16 causes only the value (100) of the data A1 to be stored and deletes the value of the data A2. When the value of the data A1 is stored, the data collection processing unit 16 adds device information and timing data to the value of the data A1. The data collection processing unit 16, for example, adds information "data A", which is the device information, and information "t1" indicating timing t1, which is the timing data, to the value of the data A1.

If the data A1 and the data A3 have the same value, the data collection processing unit 16 deletes the value of the data A3. If the data A1 and the data A4 have different values, the data collection processing unit 16 causes the value (120) of the data A4 to be stored. When the value of the data A4 is stored, the data collection processing unit 16 adds device information and timing data to the value of the data A4. The data collection processing unit 16, for example, adds the information "data A", which is the device information, and information "t4" indicating timing t4, which is the timing data, to the value of the data A4. The data collection processing unit 16 causes the internal device 15 to store the stored data (change information) 102, to which the device information and the timing data have been added.

The total amount of device data acquired as the data A is the total amount of acquired data 101. The total amount of changed device data is the total amount of stored data 102. The data collection processing unit 16 sets a smaller amount of data among the acquired data 101 and the stored data 102 as data to be transmitted to the PC 20.

The data collection processing unit 16 sets a smaller amount of data among the acquired data and the stored data on the data B as data to be transmitted to the PC 20. The data collection processing unit 16 sets a smaller amount of data among the acquired data and the stored data on the data C as data to be transmitted to the PC 20.

As described above, with the control system 100, when there is a transmission request from the PC 20 to transmit device data to the PLC 10, the PLC 10 transmits, to the PC 20, only the device data whose value has changed. Moreover, the PLC 10 compares the amount of changed data with the amount of all the device data and switches the data to be transmitted in accordance with the magnitude of the amount of data. Accordingly, it is possible to reduce the load on the PLC 10 when communicating device data. Therefore, the loss of device data to be transmitted can be prevented and other functions controlled by the PLC 10 can be prevented from being affected.

When three or more pieces of device data are transmitted at a time, the communication processing load increases when compared with the case where one piece of device data is transmitted. In the present embodiment, even when three or more pieces of device data are transmitted at the same time from the PLC 10 to the PC 20, the PLC 10 transmits, to the PC 20, only the device data whose value has changed; therefore, data can be transmitted efficiently.

When the process of switching the data to be transmitted to either changed data or all the device data is not performed, the data collection processing unit 16 may omit the addition of device information and timing data to the changed device data.

As described above, according to the embodiment, because the PLC 10 transmits, to the PC 20, changed data among the device data, even when the device data is collected over three or more times within the polling time, the data can be transmitted efficiently.

Because the data to be transmitted is switched to either changed data or all the device data in accordance with the magnitude of the amount of data, the device-data communication load can be reduced. Moreover, because device data is collectively transmitted to the PC 20, the data can be transmitted efficiently compared with the case where a request (reception) and a response (transmission) for device data are repeated.

INDUSTRIAL APPLICABILITY

As described above, the programmable logic controller according to the present invention is suitable for transmitting device data.

REFERENCE SIGNS LIST

10 PLC, 14 arithmetic processing unit, 15 internal device, 16 data collection processing unit, 17 communication processing unit, 20 PC, 40 control target device, 100 control system, 101 acquired data, 102 stored data, Z1 to Z4 device data.

The invention claimed is:

1. A programmable logic controller comprising:
a data collection processing unit comprising a processor that collects, from a control target device, device data that depends on a state of the control target device;
an internal device memory provided inside of the programmable logic controller and that stores change information on changed device data among the device data; and
a communication processing unit that, when a transmission request to transmit the device data is received by using a polling system from a display apparatus that displays a state of the control target device, transmits the change information or the collected device data to the display apparatus, the communication processing unit being configured to communicate with the display apparatus and the target control device via respective communication lines, wherein
the data collection processing unit collects the device data over three or more times within one polling time and compares previously acquired device data with currently acquired device data every time the collection is performed; generates the change information and causes the internal device memory to store the change information when the previously acquired device data is different from the currently acquired device data; compares a total amount of the change information with a total amount of the collected device data when transmitting the change information or the collected device data to the display apparatus in each polling; and restores, when the total amount of the change information is equal to or larger than the total amount of the collected device data, the collected device data by using the change information, and the communication processing unit transmits, when the total amount of the change information is equal to or larger than the total amount of the collected device data, restored device data to the display apparatus and transmits, when the total amount of the change information is smaller than the total amount of the collected device data, the change information stored in the internal device memory to the display apparatus.

2. The programmable logic controller according to claim 1, wherein the data collection processing unit restores the collected device data by using the change information on a basis of timing data indicating timing at which the change information changes.

3. The programmable logic controller according to claim 1, wherein the programmable logic controller is an apparatus configured as a unit that controls the control target device and transmits the device data or the change information to the display apparatus.

4. The programmable logic controller according to claim 1, wherein
when there is a transmission request from the display apparatus to transmit the device data, the data collection processing unit performs the comparison process and restores, when the total amount of the change information is equal to or larger than the total amount of the collected device data, the collected device data by using the change information, and
when there is a transmission request from the display apparatus to transmit the device data, in a case where the total amount of the change information is equal to or larger than the total amount of the collected device data, the communication processing unit transmits restored device data to the display apparatus and, in a case where the total amount of the change information is smaller than the total amount of the collected device data, the communication processing unit transmits the change information stored in the internal device memory to the display apparatus.

5. The programmable logic controller according to claim 1, wherein
the data collection processing unit compares previously acquired device data with currently acquired device data every time the collection is performed, and
the data collection processing unit does not cause the internal device memory to store the currently acquired device data when the previously acquired device data and the currently acquired device data are identical, and generates the change information and causes the internal device memory to store the change information when the previously acquired device data is different from the currently acquired device data.

6. The programmable logic controller according to claim 5, wherein the data collection processing unit collects the device data every scan time in each polling every time the collection is performed, causes the internal device memory to store timing data in a state included in the change information, the timing data indicating timing at which the change information changes, and, when first device data among the collected device data is not stored, restores the first device data on a basis of second device data corresponding to second timing data, which is scan timing immediately before first timing data corresponding to the first device data.

* * * * *